(12) United States Patent
Schultheis et al.

(10) Patent No.: US 8,602,614 B2
(45) Date of Patent: Dec. 10, 2013

(54) LIGHTING APPARATUS, ESPECIALLY A READING LAMP

(75) Inventors: Bernd Schultheis, Schwabenheim (DE); Achim Weil, Immesheim (DE); Andreas Dietrich, Guldental (DE); Dirk Vogel, Damscheid (DE)

(73) Assignee: Schott AG, Mainz (DE)

( * ) Notice: Subject to any disclaimer, the term of this patent is extended or adjusted under 35 U.S.C. 154(b) by 196 days.

(21) Appl. No.: 13/252,313

(22) Filed: Oct. 4, 2011

(65) Prior Publication Data
US 2012/0087142 A1  Apr. 12, 2012

Related U.S. Application Data

(60) Provisional application No. 61/391,707, filed on Oct. 11, 2010.

(30) Foreign Application Priority Data

Oct. 11, 2010  (DE) .......................... 10 2010 042 287

(51) Int. Cl.
*F21V 21/14* (2006.01)

(52) U.S. Cl.
USPC ............................ 362/471; 362/490; 362/275

(58) Field of Classification Search
USPC .................................. 362/490, 471, 269, 275
See application file for complete search history.

(56) References Cited

U.S. PATENT DOCUMENTS

| 2,011,692 | A |   | 8/1935 | Simpson |   |
|---|---|---|---|---|---|
| 5,070,434 | A | * | 12/1991 | Suman et al. | 362/490 |
| 5,951,155 | A | * | 9/1999 | Lanser | 362/490 |
| 6,578,994 | B1 |   | 6/2003 | Beyerlein |   |
| 7,249,873 | B2 | * | 7/2007 | Tiesler et al. | 362/488 |
| 7,434,962 | B2 | * | 10/2008 | Stache | 362/288 |
| 8,029,161 | B2 | * | 10/2011 | Ono | 362/269 |
| 8,132,943 | B2 | * | 3/2012 | Wang | 362/362 |
| 8,267,558 | B1 | * | 9/2012 | Glater | 362/490 |
| 2005/0174791 | A1 | * | 8/2005 | Bynum | 362/490 |
| 2005/0276056 | A1 | * | 12/2005 | Tiesler | 362/490 |
| 2007/0053194 | A1 | * | 3/2007 | Tiesler et al. | 362/490 |
| 2010/0002443 | A1 |   | 1/2010 | Schultheis et al. |   |

FOREIGN PATENT DOCUMENTS

| DE | 197 41 038 | 3/1999 |
|---|---|---|
| DE | 199 26 561 | 12/2000 |
| WO | 2006/041417 | 4/2006 |
| WO | 2008/055694 | 5/2008 |

* cited by examiner

*Primary Examiner* — Laura Tso
(74) *Attorney, Agent, or Firm* — Michael J. Striker

(57) ABSTRACT

The lighting apparatus, especially a reading lamp, has a light source (48), a movable cover (24) to which the light source (48) is fastened, an adjusting element (21) that cooperates with the cover (24), a bearing unit (26) for supporting the cover (24) and an adjusting ring (21). The cover (24) and light source (48) are movable around a longitudinal axis (L) of the lighting apparatus (10) by actuating the adjusting element (21) and the cover (24) and light source (48) are moveable around a transverse axis (Q) extending perpendicular to the longitudinal axis (L) by actuating the cover (24). The lighting apparatus in the form of the reading lamp is particularly useful aboard aircraft, ships, trains, automobiles, or other vehicles.

16 Claims, 4 Drawing Sheets

LIGHTING APPARATUS, ESPECIALLY A READING LAMP

CROSS-REFERENCE

The invention described and claimed herein below is also described in German Patent Application DE 10 2010 042 287.8, filed on Oct. 11, 2010 in Germany and in U.S. Provisional Application, Ser. 61/391,707, filed Oct. 11, 2010. The subject matter of the aforesaid German Patent Application and the U.S. Provisional application is incorporated herein by express reference thereto and provides the basis for a claim of priority of invention for the invention claimed herein below under 35 U.S.C. 119(a)-(d) and under 35 U.S.C. 119(e) respectively.

BACKGROUND OF THE INVENTION

1. The Field of the Invention

The present invention relates to, a lighting apparatus, especially a reading lamp. Lighting apparatuses of this kind are used as reading lamps, particularly in places where lighting conditions change frequently and the illumination of a particular area should be individually adjustable. Typical places in which they are used include aircraft and trains in which the lighting conditions change, for example when flying through clouds or passing through tunnels; when this happens, an illumination of the entire cabin or compartment is on the one hand too energy intensive and on the other hand, does not permit individual adjustment. The individual adjustability should make it possible to illuminate a particular area or item—which preferably lies within the field of vision of one passenger—according to the passenger's wishes. If the passenger wishes to read, then sufficient illumination of the information medium should be provided. If the passenger wishes to stop reading, for example to take a break, then it should be possible to switch off the light. At the same time, the illumination should be designed so that it does not disturb neighbors.

2. The Description of the Related Art

A lighting apparatus, especially a reading lamp, is known from German Patent Application DE 199 26 561 A1, which comprises a light source and a frame carrying the light source, which is pivotable about at least one of a horizontal axis and/or vertical axis and is fixed in selected positions.

Other forms of this sort of light apparatus are known, especially from German Patent Application DE 197 41 038 A1 or U.S. Pat. No. 2,011,692 A, in which the light source is arranged in rotatable component, such as an extended pivotable cylinder rotatable about its longitudinal axis in a housing, or in a pivotable cover.

WO 2006/041417 has disclosed a reading lamp that is situated on the underside of a monitor that can be pivoted out from the seat rest of an aircraft seat. This reading lamp can be used to illuminate the folding tray table. This reading lamp, however, is attached to the monitor so that it can only be used in certain positions. In addition, the monitor must be pivoted out from the seat back in order to activate the reading lamp. As a result, the monitor covers part of the information medium, for example, and limits the already restricted space for the passenger.

Particularly when a reading lamp of this kind is used aboard aircraft, it is necessary to take into account other special requirements. The available space in aircraft cabins is very limited and in addition, the weight of the lighting apparatus should be reduced as much as possible. The lighting apparatus also should not constitute an injury hazard and must comply with strict fire prevention regulations and in particular, should be flame resistant.

WO 2008/055694 has disclosed a lighting apparatus that is, on the one hand, compactly designed and, on the other hand, ensures a flexible illumination of items, having a light source and a light-guiding element that can be pivoted and/or tilted around a pivoting/tilting point and has at least one light-guiding axis and at least one light input surface and one light output surface, with the light-guiding element being axially movable and arranged so that between the light source and the light input surface, an open space is arranged through which light shines. This device has proven useful in actual practice, but places high demands on production precision and requires a relatively complex mechanism.

SUMMARY OF THE INVENTION

The object of the present invention, therefore, is to disclose a lighting apparatus that meets the above-mentioned requirements, is reliable, and at the same time counters the disadvantages of the lighting apparatuses known from the prior art. In addition, the lighting apparatus should offer the user a high level of operating convenience and should be visually and tactilely pleasing.

The object is attained with a lighting apparatus, especially a reading lamp, including a light source, a movable cover to which the light source can be fastened, an adjusting element that cooperates with the cover, and a bearing unit for supporting the cover and the adjusting element; when the adjusting element is actuated, the cover and light source can be rotated around the longitudinal axis of the lighting apparatus and when the cover is actuated, the cover and light source can be moved around a transverse axis extending perpendicular to the longitudinal axis. The adjusting element is easily accessible to the user so that the cover and the light source connected to the cover can be moved around the longitudinal axis by means of the adjusting element and in particular, can be rotated around the longitudinal axis. This makes it possible for the light cone generated by the light source to be adjusted in a manner that is convenient for the user. The design of the lighting apparatus according to the invention makes it possible to reduce the number of required parts, enabling a more compact design of the lighting apparatus. In addition, reducing the number of required parts increases the reliability of the lighting apparatus.

Preferably, the adjusting element is embodied in the form of an adjusting ring that encompasses the cover in an annular fashion; by actuating the cover, the light source can be pivoted around the transverse axis from a first position into a second position; in the first position, the light source is covered by the adjusting ring or by the bearing unit. Because the light source is covered by the adjusting ring in the first position, it does not produce a light cone that exits from the lighting apparatus. To the user, therefore, it appears to be switched off even when it is switched on. In this design, it is possible to eliminate a switching device for switching the light source on and off, thus permitting a compact design of the lighting apparatus. In this case, the light source can remain switched on all the time. The embodiment of the adjusting element in the form of an adjusting ring that encompasses the cover allows the user to conveniently rotate the cover.

In a preferred embodiment of the lighting apparatus according to the invention the light source can be switched on and off by actuating the cover; in the first position, the light source is switched off and in the second position, the light source is switched on. In this embodiment, the cover once again performs a switching function so that it is unnecessary to provide an additional switching or actuating element. As explained above, when the cover is actuated, the cover itself and the light source that cooperates with it are moved around the transverse axis of the lighting apparatus. At the same time, the light source can be switched on and off by actuating the cover so that the user can determine the desired position of the light source and can switch it on or off. In the first position, the light source is covered by the adjusting element so that it does not produce a light cone that exits the device.

Consequently, in the first position, the lighting apparatus does not contribute to illuminating a particular area or item outside the lighting apparatus. In this embodiment, the light source is witched off in the first position so that no unnecessary energy is consumed and no unnecessary heat is produced inside the lighting apparatus. The lighting apparatus can therefore be operated in an energy efficient, resource-conserving way and can therefore be operated for longer periods of time. At the same time, the cover serves as a sort of rocker switch that can be used to switch the light source on and off. For example, this can be implemented in the form of a correspondingly designed contact switch.

In a modification of the lighting apparatus according to the invention, the light source has a beam axis, which in the first position, is inclined relative to a plane extending perpendicular to the longitudinal axis by an angle oriented toward the second position. Usually, due to their construction, the cover and light source cannot be moved around the transverse axis by an arbitrary amount. Typically, it is not possible to exceed a certain adjustment range. In some cases, however, it is necessary to illuminate an item that cannot be reached with the available adjustment range when the beam axis is extending perpendicular to the longitudinal axis in the first position of the light source. In the first position, the inclination of the beam axis of the light source toward the second position relative to the plane extending perpendicular to the longitudinal axis permits this item to be illuminated as well. Preferably, the angle is between 1 and 20°, typically 8 to 10°. The angle is selected in accordance with the position of the items to be illuminated. An adjusting device can be provided for adjusting the angle so that the light cone produced by the light source can be easily adapted to the given circumstances of the item to be illuminated.

In another embodiment, the bearing unit also includes a bearing ring and a support element that can be inserted into it and moved; the support element can be attached to the cover. With this arrangement, it is easily possible to provide the necessary mobility of the cover and at the same time to implement a simple assembly.

It is also preferable if the cover has a front surface and the adjusting element has a surface that adjoins the front surface, with the front surface and the surface extending seamlessly into one another in the first position. On the one hand, this has visual advantages since it gives the lighting apparatus the appearance of a homogeneous unit and on the other hand, it does not produce any edges that could constitute an injury hazard. In this case, the front surface of the cover and the surface of the adjusting element adjacent to the front surface do not necessarily have to be planar, but can instead each have their own arched curvature and these arched curvatures do not necessarily have to transition into each other smoothly. It is likewise conceivable for the front surface to be planar, but for the surface of the adjusting element adjacent to the front surface to be arched. In that case, the front surface of the cover can easily protrude beyond the surface of the adjusting element or can be recessed into the adjusting element.

Preferably, the bearing unit includes a housing to which the adjusting element or adjusting ring can be fastened in rotating fashion. The adjusting element or adjusting ring can be fastened to the housing by a bayonet connection. The housing protects and stabilizes the lighting apparatus. The housing also serves to accommodate the adjusting element so that no further components are required for this purpose. In order to accommodate the adjusting element, the housing can be equipped with a radially protruding collar at one end.

In a modification of the lighting apparatus according to the invention, the bearing unit includes a detent curve along which the adjusting ring travels as it is rotated. The detent curve can, for example, be situated on a housing surface that cooperates with the adjusting element. The detent curve in this case can have a number of projections that an elastic part must pass over during rotation of the adjusting element. The elastic parts can, for example, be spring-loaded pins. When the elastic element is situated in a recess between two adjacent projections, this establishes an adjusting position of the adjusting element. Depending on the number of projections, a larger or smaller number of adjusting positions is provided. On the one hand, this prevents the adjusting element from being able to move by itself and on the other hand, it gives the user tactile feedback that offers him a certain degree of guidance during rotation of the adjusting element.

Preferably, the housing has a circumferential surface with a thread onto which one or more mounting nuts can be screwed. The housing can be inserted into an installation opening, for example of a bulkhead or an aircraft seat and by means of the mounting nuts, can be fastened to the surfaces surrounding the installation opening. If the housing is equipped with the radially protruding collar onto which the adjusting element is placed, then the collar additionally serves as a supporting surface with which the lighting apparatus is placed against the surfaces surrounding the installation opening and by means of the mounting nut, can be clamped against the surfaces on the opposite side of the wall. In this case, only one mounting nut is required. If the housing does not have the radially protruding collar, then the lighting apparatus can be clamped with two mounting nuts. The farther the mounting nuts and the radially protruding collar extend from the housing, the larger this permits the installation opening to be for insertion of the lighting apparatus. This achieves an increased flexibility in the installation since it is not necessary to provide a bore diameter of the installation opening that is especially adapted to the lighting apparatus. It is also unnecessary to maintain a particular tolerance or precision. Furthermore, the lighting apparatus can be installed in walls of different thicknesses.

It is also advantageous if the support element has a bearing surface with an opening or a through opening and the light cone produced by the light source shines through the opening or through opening or if the light source is situated in the opening or through opening. The bearing surface permits the support element to move in the bearing ring and be secured by it. Depending on the design, the opening or through opening permits the light source to be situated in the support element and therefore to be accommodated in a space-saving fashion. The support element therefore serves not only to support the cover, but also to fasten the light source.

Preferably, it is possible to cause a locking element to lock and prestress the cover by moving the cover from the second position into a third position and on account of the prestressing force the cover is moved into the first position; it is also possible to unlock the cover by moving it from the first position into the third position and because of that the prestressing force moves the cover into the second position. This provides the user with a particularly simple operation. To move the cover and thus switch on the light source, the user only needs to move the cover into a third position, which preferably occurs by pressing on the cover in the first position. In this case, the third position is situated on the side of the plane, which extends perpendicular to the longitudinal axis, opposite from the side of the second position. In the third position, the locking element is unlocked and the prestressing force moves the cover into the second position as soon as the user releases the cover. To lock the cover, the user moves the cover counter to the prestressing force into the third position in which the locking element is locked. The prestressing force then moves the cover back into the locked first position in which it remains until the user unlocks it again in the above-described way.

Preferably, it is possible to prestress the cover by means of a spring element. Spring elements are widely used, inexpensive-to-procure components that are both highly reliable and light-weight. In addition, it is possible to use spring elements even in places where space is limited, making it possible to implement the prestressing of the cover in a way that saves space and reduces cost and weight. Moving the cover from the second position into the third position prestresses the spring element so that the prestressing force is produced.

In another embodiment, the support element has a toothed rack and the bearing ring has a damping element; the toothed rack and the damping element cooperate to move the cover around the transverse axis and also to limit the mobility of the cover around the transverse axis. In addition, they brake the movement of the cover between the first or third position and the second position. The movement of the cover between the first or third position and the second position therefore occurs in a gentle fashion so that the cover does not suddenly jump from the first or third position into the second position. This prevents damage to the components since it prevents hard collisions between them. The damping element in this case is equipped with a gear that has a correspondingly damped bearing and rolls along the toothed rack. The toothed rack is curved and follows the movement of the support element. The limiting of the mobility can be achieved by the gear or toothed rack having a raised tooth that prevents the gear from rolling along the toothed rack once a certain position is reached. Alternatively, the teeth—for example on the toothed rack—can end so that there are no longer corresponding teeth of the toothed rack for the teeth of the gear to cooperate with, as a result of which there is no further mobility once a certain position of the support element relative to the bearing ring is reached. The active limiting of the mobility is particularly important because for structural reasons, it is only possible to implement a particular amount of the mobility between the first and second position, which cannot be exceeded since otherwise, the support element could be detached from the bearing ring.

In addition, the lighting apparatus has an immobilizing element that cooperates with the housing to immobilize the bearing ring and the support element. In this way, the bearing ring and the support element can be immobilized in their position in a simple way, for which purpose the immobilizing element and the housing can be attached to each other by means of a clip or snap connection. The immobilizing element closes the housing at the end opposite from the cover so that no moisture can penetrate into the housing. This is important particularly with regard to the electronic components accommodated inside the housing.

In a preferred modification, the light source is able to rotate or pivot by 40° or less around the longitudinal axis (L) and by 40° or less around the transverse axis (Q); it is possible to limit the mobility of the light source around the longitudinal axis (L) by means of one or more stop elements (42). It is thus possible to prevent the light source from being directed at an item that is resting on the neighbor's seat. This therefore prevents it from disturbing the neighbor. It also prevents the light source from being rotated several times in the same rotation direction around the longitudinal axis, which can result in a twisting of and possibly damage to the cable or to the breakage of soldered connections. Another technical effect arises from the fact that the adjusting ring, which is fastened to the housing by means of a bayonet connection, cannot be rotated into a position in which the bayonet connection can be detached and the adjusting ring can be removed from the housing.

Preferably, the light source is able to rotate or pivot by 80° or less around the longitudinal axis and by 40° or less around the transverse axis; it is possible to limit the mobility of the light source around the longitudinal axis by means of one or more stop elements. It has turned out that a rotatability and pivotability within this angular range is sufficient for the use according to the invention and at the same time can be controlled to a favorable degree from a design standpoint without having to take separate steps that would require additional space. The lighting apparatus can thus be embodied with a simple and compact design. The stop elements can preferably be set at angular intervals of 5° so that preferable intermediate positions can be set within the given angular range. This makes it possible to take into account special circumstances of the environment to be illuminated.

Preferably, the light source includes an LED with a lens for focusing the beam path. LEDs feature high energy utilization with simultaneously low heat generation and low space requirements. In addition, the lens can be used to produce the desired light cone with which it is possible to illuminate, for example, the information medium or the folding tray table in an aircraft. In a modification, the LED is mounted on a first switch plate that is situated in the cover. The first switch plate includes a microchip that switches the LED on when the cover is moved from the first position into the second position and switches the LED off when the cover is moved from the second position into the first position. This arrangement permits a compact design of the lighting apparatus. In this case, it is possible for the first switch plate to be connected by means of a cable harness to a second switch plate that is equipped with the voltage supply and the control unit for the LED. Providing two switch plates saves space in the cover.

It is also preferable for the cover to have one or more transparent regions that can be illuminated by means of at least one additional light source. It can be helpful to provide at least one light guide behind the transparent region in the cover in order to homogeneously illuminate the transparent region. The transparent regions serve as orientation aids in the dark, making it possible to determine the position of the lighting apparatus and in particular of the cover. The transparent region can be illuminated independently by the light source and can be illuminated all of the time, only when the light source is switched off, or as a function of lighting conditions in the vicinity. The additional light source can also be embodied in the form of an LED, which is situated on the first switch plate. In order to save space, the additional light source can be embodied to be as small as possible. The light guide is used to homogeneously illuminate the transparent region.

Preferably, the cover is composed of a polycarbonate and the adjusting element is composed of an acrylonitrile butadiene styrene (ABS) or they are composed of polycarbonate and/or acrylonitrile butadiene styrene. Polycarbonates and PC/ABS blends or polyamide, which can be glass fiber-reinforced, are particularly suitable for inexpensively manufacturing visually or tactilely pleasing surfaces. In addition to the increased strength, the glass fiber reinforcement also has the advantage of being fire-resistant, thus enabling compliance with fire prevention regulations, particularly in air travel. These surfaces can also be cleaned with conventionally used cleaning agents and do not stain when exposed to red wine or other beverages. In addition, these surfaces are abrasion resistant even if they are painted. The cover and the adjusting element can be manufactured using the injection molding process, without visible separation lines being produced when they are removed from the mold. With regard to a large amount of possible embodiments, the cover and the adjusting element can be painted differently. Consequently, it is particularly suitable to use paint systems that are composed of bonding agents, base coats, and a clear topcoat; depending on the plastic used, it is also possible to omit the bonding agent. Alternatively, the cover and/or the adjusting element can be chrome-plated or coated, for example, by means of a "plasma induced chemical vapor deposition" (PICVD) method. The thickness of the paint or chrome-plating layer is approx. between 20 and 40 μm.

Another aspect of the present invention relates to the use of a lighting apparatus as recited in one of the preceding exemplary embodiments, especially as a reading lamp aboard aircraft, ships, trains, automobiles, or other vehicles. The advantages ensuing therefrom correspond to those that have been discussed above for the various exemplary embodiments of the lighting apparatus.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
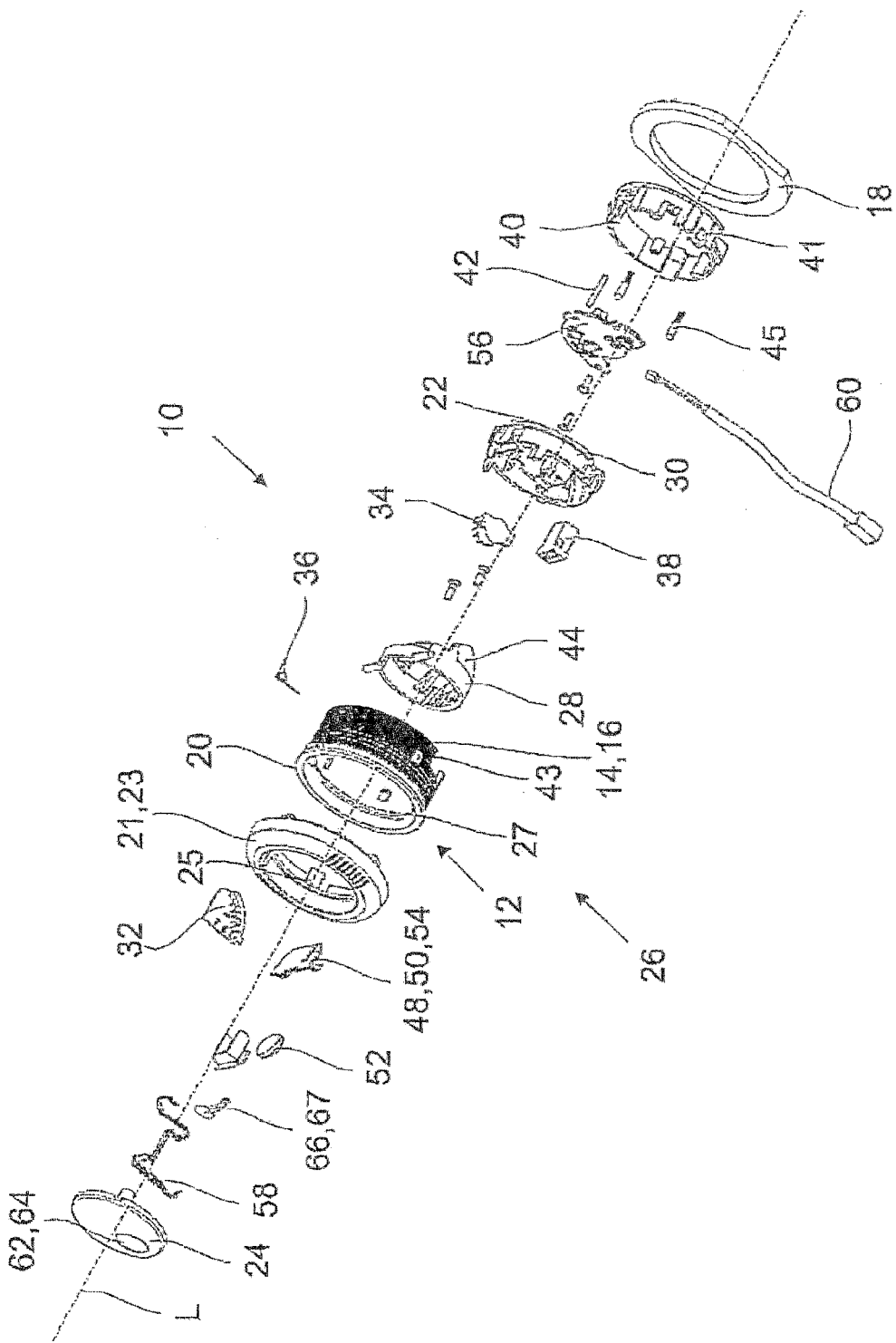
FIG. 1 is an exploded perspective view of an exemplary embodiment of the lighting apparatus according to the invention.

The exemplary embodiment of the lighting apparatus 10 according to the invention shown in FIG. 1 includes a housing 12 with a circumferential surface 14 on which a thread 16 is provided, onto which a mounting nut 18 can be screwed. The housing 12 has a radially protruding collar 20 to which an adjusting element 21 can be fastened in a way that permits it to be rotated around a longitudinal axis L of the lighting apparatus 10. In the exemplary embodiment shown, the adjusting element 21 is embodied in the form of an adjusting ring 23 that encompasses a cover 24. The adjusting ring 23 is fastened to the housing 12 by means of a bayonet connection. To this end, the adjusting ring 23 has a detent element 25 that cooperates with a projection 27 on the inner surface of the housing 12 and immobilizes the adjusting ring 23 in the axial direction. The projection 27 extends over a wide range along the inner surface so that when fastened in place, the adjusting ring 23 can be rotated over a corresponding angular range without suspending the axial immobilization.

The lighting apparatus 10 once again has the cover 24, which is supported in a rotatable and pivotable fashion by a bearing unit 26. The cover 24 cooperates with the adjusting element 21 so that it can be rotated by rotating the adjusting element 21 around the longitudinal axis L of the lighting apparatus 10. In this case, the adjusting element 21 can cooperate directly with the cover 24 or indirectly with the bearing unit 26. In the latter case, the rotation of the bearing unit 26 by the adjusting element 21 causes the cover 24 to rotate. In this case, the bearing unit 26 has a support element 28 that is connected to the cover 24 and can be inserted into a bearing ring 30 and fastened to it. The support element 28 in this case can be rotated in the bearing ring 30, both around the longitudinal axis L and around a transverse axis Q extending perpendicular to the longitudinal axis L.

The bearing ring 30 also has a toothed rack 32 that cooperates with a damping element 34 situated in the support element 28. The support element 28 is prestressed in relation to the bearing ring 30 by means of a spring element 36. In order to lock the support element 28 in the first position, a locking element 38 is provided, which cooperates with the support element 28 and the bearing ring 30. The toothed rack 32 and the locking element 38 establish a first, second, and third position between which the support element 28 and therefore the cover 24 can be moved.

The support element 28 and bearing ring 30 are positioned and fastened in the housing 12 by means of an immobilizing element 40. The immobilizing element has one or more immobilizing hooks 41 that engage in openings or recesses 43 of the housing 12. In the immobilizing element 40, one or more stop elements 42 are also provided, which can be used to limit the mobility of the cover 24 around the longitudinal axis L. The limitation of the mobility of the cover 24 is also important because it prevents the cover 24 from being rotated into a position in which the bayonet connection to the housing 12 could be detached. The bearing ring 30 includes a detent curve 22 that cooperates with the immobilizing element 40. To this end, spring-loaded pins 45 are provided, which can be accommodated in corresponding holes of the immobilizing element 40. Their free ends cooperate with the detent curve 22 and at the same time, the pins 45 prestress the supporting components of the lighting apparatus 10 so that they do not rattle, even with the occurrence of powerful vibrations of the kind that can occur particularly in aircraft.

When the adjusting element 21 is rotated, the bearing ring 30 is likewise rotated and travels along the detent curve 22. In doing so, the force that the user exerts to rotate the adjusting element is met with alternating higher and lower levels of resistance, thus providing the user with tactile feedback.

The support element 28 has a longitudinal surface 44 with an opening 46 or through opening. In the opening 46 or through opening and/or radially inward therefrom, a light source 48 is provided, which has a lens 52, an LED 50, and a first switch plate 54. The lens 52 in this case covers the opening 46 or through opening. The immobilizing element 40 contains a second switch plate 56 that is connected via a cable harness 58 to the first switch plate 54. An energy supply line 60, which is also referred to as a pigtail 60, leads from the second switch plate 56. The pigtail 60 can be used to connect the lighting apparatus 10 to an energy supply system, e.g. of the aircraft. The lens 52 focuses the light produced by the LED 50 so that a beam axis S is produced. According to the invention, in the first position of the cover 24, this beam axis S is inclined by an angle α toward the second position relative to a plane extending perpendicular to the longitudinal axis L.

This can be achieved either through a correspondingly aligned installation of the LED 50 or a corresponding curvature of the lens 52 used.

The cover 24 has a front surface 68 with one or more transparent regions 62. For example, these can be produced by manufacturing the cover 24 out of a transparent material and then coating it with a non-transparent paint except for the transparent regions 62. The transparent regions 62 are illuminated by means of a light guide 66 and an additional light source 67. The transparent region 62 in this case is situated in a depression 64 on the front surface 68, which gives the user an indication of the preferred actuation point of the cover 24.

Figure 2:
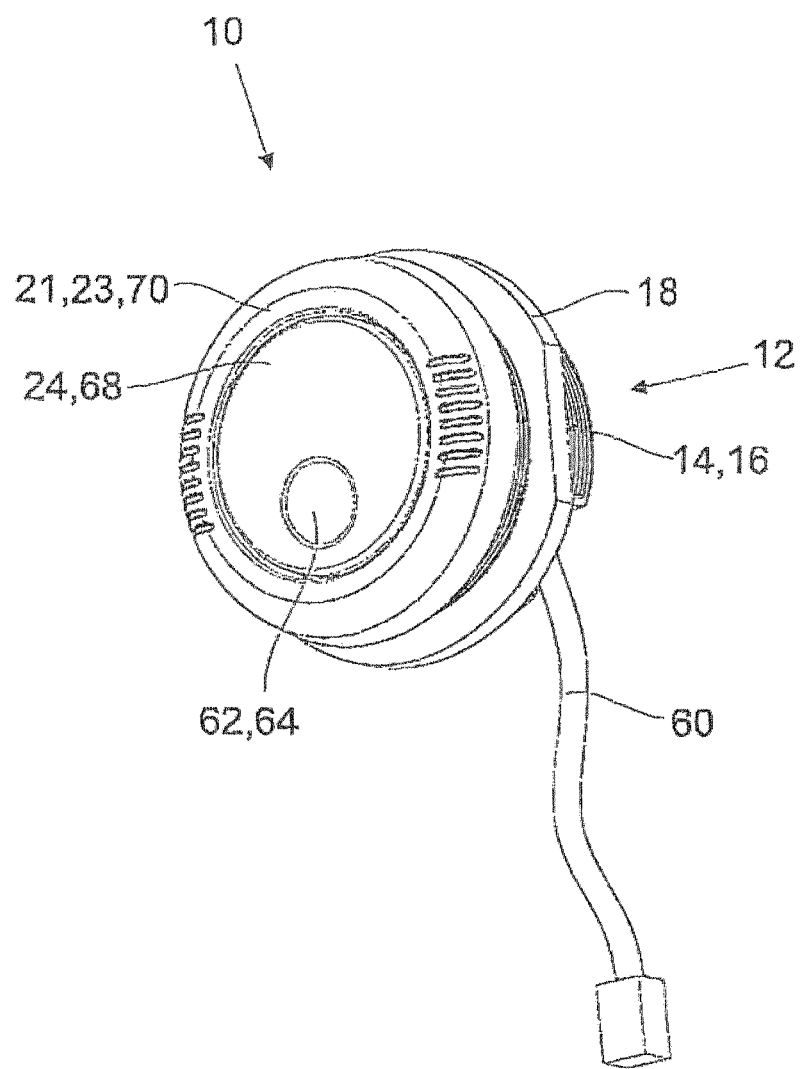
FIG. 2 is a perspective view of the exemplary embodiment of the lighting apparatus according to the invention shown in FIG. 1 in the assembled state and in the first position.
Figure 3:
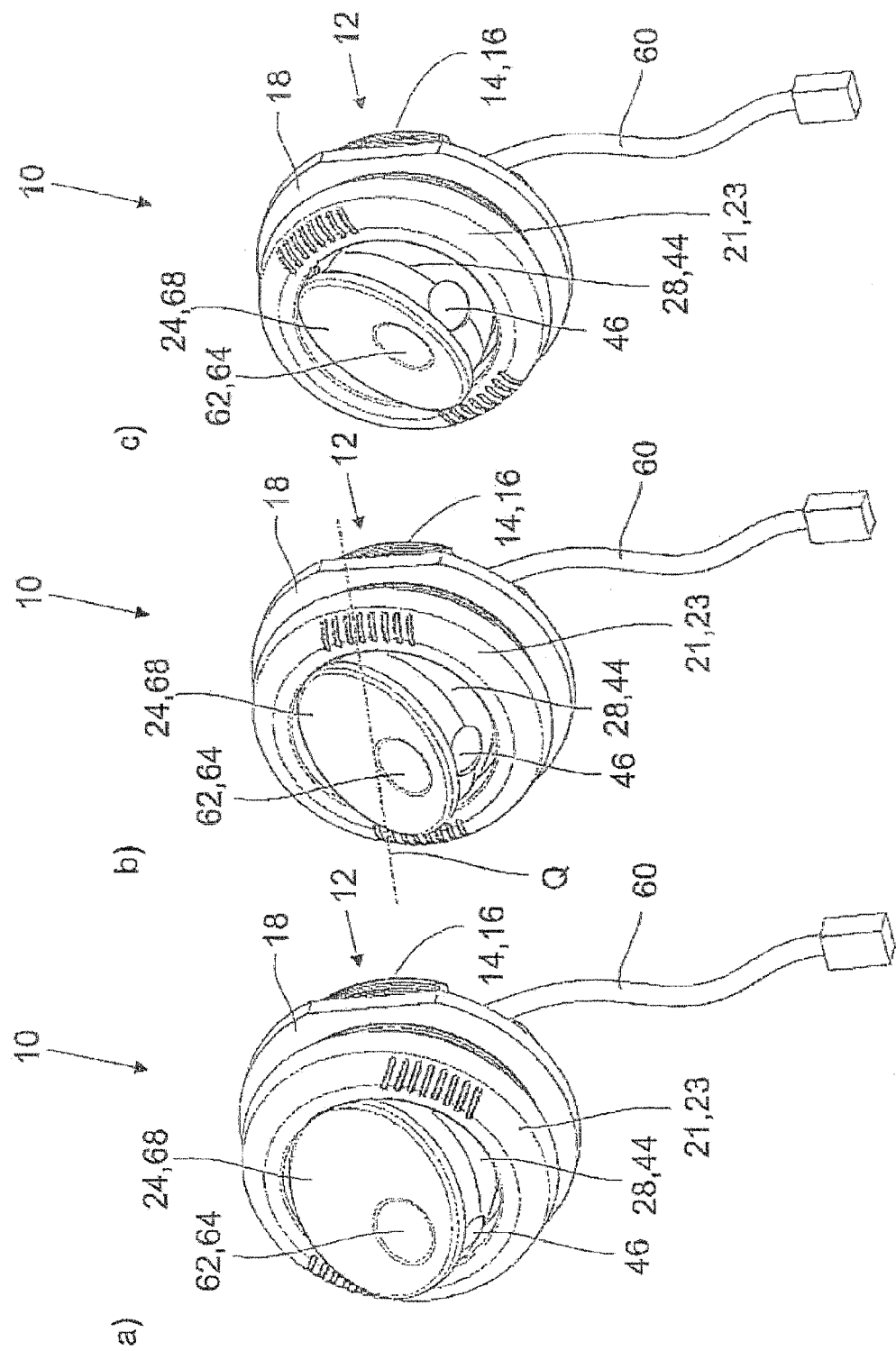
FIGS. 3a, 3b, and 3c show the exemplary embodiment shown in FIGS. 1 and 2 in the second position.

FIG. 2 shows the lighting apparatus 10 according to the invention in the assembled state and in the first position. The adjusting element 21 has a surface 70 that extends adjacent to the front surface 68 without any outward-protruding edges. Pressing the cover 24 into a third position unlocks the locking element 38 so that the support element 28, in response to the prestressing force exerted by the spring element 36, is moved into the second position, which is shown in FIG. 3. At the same time, the light source 48 is switched on. In the second position, the through opening 46 is no longer covered by the adjusting element 21 or the bearing unit 26. Consequently, a light cone can exit the lighting apparatus 10 and illuminate an item. The light cone can be rotated around the longitudinal axis L of the lighting apparatus 10 by rotating the adjusting element 21. In FIG. 3a), the adjusting element 21 and therefore the cover 24 are rotated to the left by approx. 30° and in FIG. 3c), they are rotated to the right by approx. 30°, each counting from the middle position shown in FIG. 3b).

Figure 4:
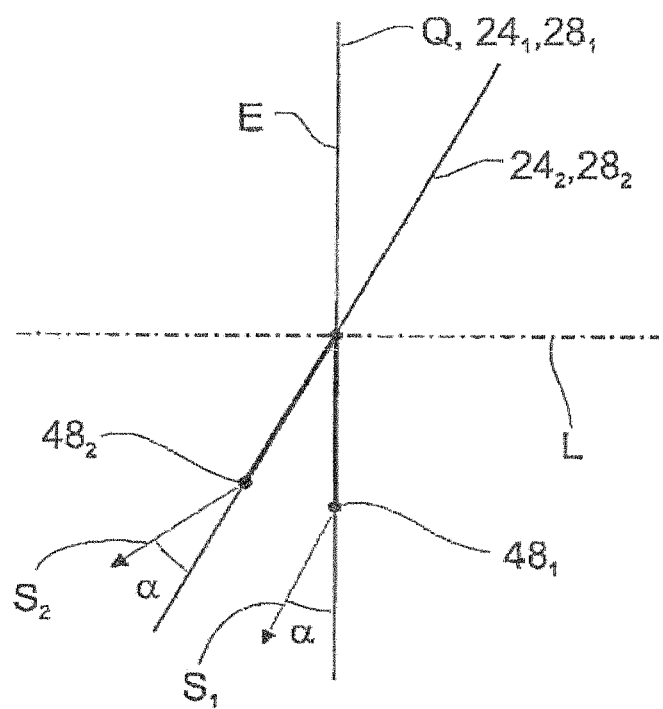
FIG. 4 is a diagrammatic view of the arrangement of the cover and the light source and the beam axis relative to the longitudinal axis of the lighting apparatus.

FIG. 4 is a schematic depiction of how the light source 48 and the support element 28 with the cover 24 can be moved between the first position and the second position. In this case, the first position is indicated by the index 1 and the second position is indicated by the index 2. The cover 24 is depicted very schematically in the form of a line extending along the maximum span of the cover. Since the light source 48 is fastened to the support element 28, it is situated on the line that symbolizes the cover 24 and the support element 28. The longitudinal axis L and the transverse axis Q define a plane E, with the plane E extending perpendicular to the longitudinal axis L and with the transverse axis Q lying in the plane E. It is assumed that the cover 24 extends along the transverse axis Q in the first position. The beam axis S of the light source 48 that is situated on the bearing surface 44 of the support element 28, however, does not extend parallel to the transverse axis Q, but instead encloses an angle α with it. If the support element 28 with the cover 24 is brought into the second position, then the angle α travels along with it. In this way, the beam axis S relative to the plane E in the second position forms an angle that is a greater than the angle by which the support element and the cover have been pivoted between the first position and the second position.

PARTS LIST 10 lighting apparatus
12 housing
14 circumferential surface
16 thread
18 mounting nut
20 radially protruding collar
21 adjusting element
22 detent curve
23 adjusting ring
24 cover
26 bearing unit
28 support element
30 bearing ring
32 toothed rack
34 damping element
36 spring element
38 locking element
40 fixing element
41 fixing hook
42 stop element
43 opening, recess
44 bearing surface
45 prestressed pin
46 opening/through opening
48 light source
50 LED
52 lens
54 first switch plate
56 second switch plate
58 cable harness
60 line/pigtail
62 transparent region
64 depression
66 light guide
68 front surface
70 surface
E plane
L longitudinal axis
Q transverse axis
S beam axis
α angle While the invention has been illustrated and described as embodied in a lighting apparatus, especially a reading lamp, and uses thereof, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

What is claimed is:

1. A lighting apparatus, especially a reading lamp, having a longitudinal axis (L) and comprising
   a light source (48);
   a movable cover (24) to which the light source (48) can be fastened;
   an adjusting element (21) that cooperates with the cover (24); and
   a bearing unit (26) for supporting the cover (24) and the adjusting element (21);
   wherein the cover (24) and light source (48) are movable around the longitudinal axis (L) of the lighting apparatus (10) by actuating the adjusting element (21) and the cover (24) and light source (48) are movable around a transverse axis (Q) extending perpendicular to the longitudinal axis (L) by actuating the cover (24),
   wherein the adjusting element (21) is embodied in the form of an adjusting ring (23) that encompasses the cover (24) in an annular fashion and the light source (48) is pivotable around a transverse axis (Q) from a first position into a second position by actuating the cover (24) and in the first position, the light source (48) is covered by the adjusting ring (23) and by the bearing unit (26).

2. The lighting apparatus as recited in claim 1, wherein the light source (48) is switched on and off by actuating the cover (24) and wherein the light source is switched off in the first position and switched on in the second position.

3. The lighting apparatus as recited in claim 2, wherein the light source (48) has a beam axis (S), which in the first position, is inclined toward the second position at an angle ($\alpha$) relative to a plane (E) extending perpendicular to the longitudinal axis (L).

4. The lighting apparatus as recited in claim 3, wherein said angle ($\alpha$) is between 1° and 20°.

5. The lighting apparatus as recited in claim 1, wherein the bearing unit (26) includes a bearing ring (30) and a support element (28) that is insertable and movable in the bearing ring (30) and wherein said support element (28) is connectable to the cover (24).

6. The lighting apparatus as recited in claim 1, wherein the bearing unit (26) comprises a housing (12) and the adjusting ring (23) is attached in a rotating fashion to the housing (12).

7. The lighting apparatus as recited in claim 5, wherein the bearing unit (26) includes a detent curve (22) along which the adjusting ring (23) travels as the adjusting ring (23) is rotated.

8. The lighting apparatus as recited in claim 5, wherein the support element (28) has a bearing surface (44) with an opening or through opening (46) and the light source (48) produces a light cone that propagates through the opening or through opening (46) or the light source (48) is situated in the opening or through opening (46).

9. The lighting apparatus as recited in claim 5, wherein the cover (24) is lockable and prestressable in a third position by means of a locking element (38) and as a result of a prestressing force is moved into the first position, and the cover (24) is releasable by moving the cover from the first position into the third position and is moved into the second position as a result of the prestressing force.

10. The lighting apparatus as recited in claim 9, wherein the over (24) is prestressed by means of a spring element (36).

11. The lighting apparatus, as recited in claim 9, wherein the support element (28) of the bearing unit (26) has a toothed rack (32) and the bearing ring (30) has a damping element (34), the toothed rack (32) and the damping element (34) cooperate to move the cover (24) around the transverse axis (Q) and also to limit the mobility of the cover (24) around the transverse axis (Q).

12. The lighting apparatus as recited in claim 5, wherein the bearing unit (26) comprises a housing (12) and the adjusting ring (23) is attached in a rotating fashion to the housing (12), and further comprising an immobilizing element (40) that cooperates with the housing (12) to immobilize the bearing ring (30) and the support element (28).

13. The lighting apparatus as recited in claim 11, wherein the light source (48) is pivotable by 80° or less around the longitudinal axis (L) and by 40° or less around the transverse axis (Q), and further comprising one or more stop elements (42) that limit the mobility of the light source around the longitudinal axis (L).

14. The lighting apparatus as recited in claim 1, wherein the light source (48) includes an LED (50) with a lens (52) for focusing a beam path (S) from the light source (48), the LED (50) is mounted on a first switch plate (54) that is located on the cover (24) and the first switch plate (54) is connected to a second switch plate (56) by a cable harness (58).

15. The lighting apparatus as recited in claim 14, wherein the cover (24) has one or more transparent regions (62) and further comprising at least one additional light source (67) that is able to illuminate said one or more transparent regions (62).

16. A vehicle, especially an aircraft, a ship, a train, or an automobile, comprising a lighting apparatus (10) in the form of a reading lamp according to claim 1.

\* \* \* \* \*